April 7, 1953     C. A. CHAMBERLAIN     2,633,928
DEHUMIDIFYING APPARATUS
Filed Sept. 28, 1946     10 Sheets-Sheet 1
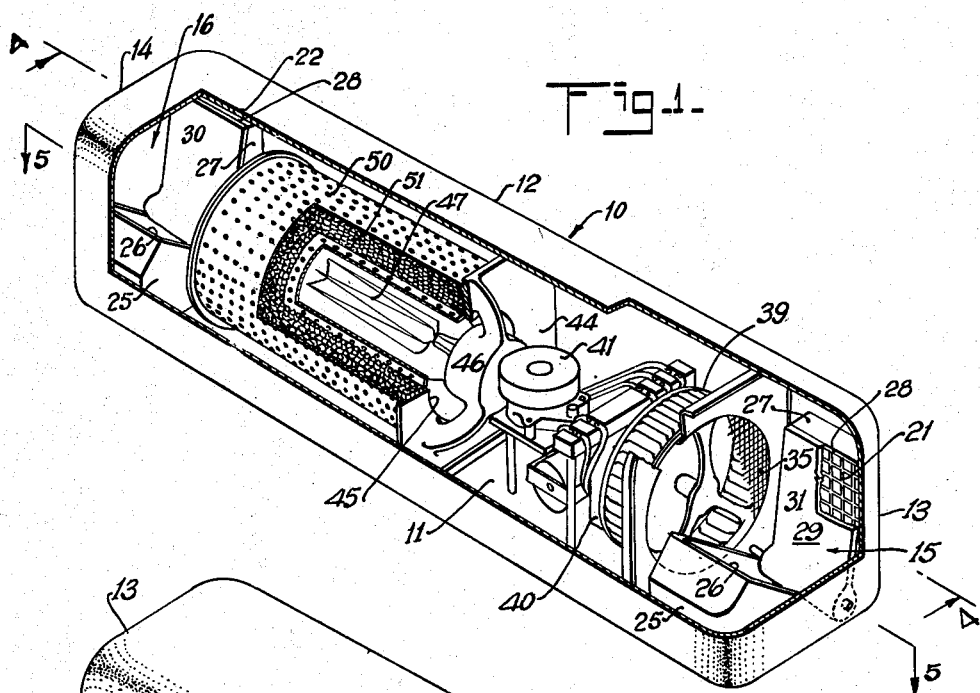
Fig.1.
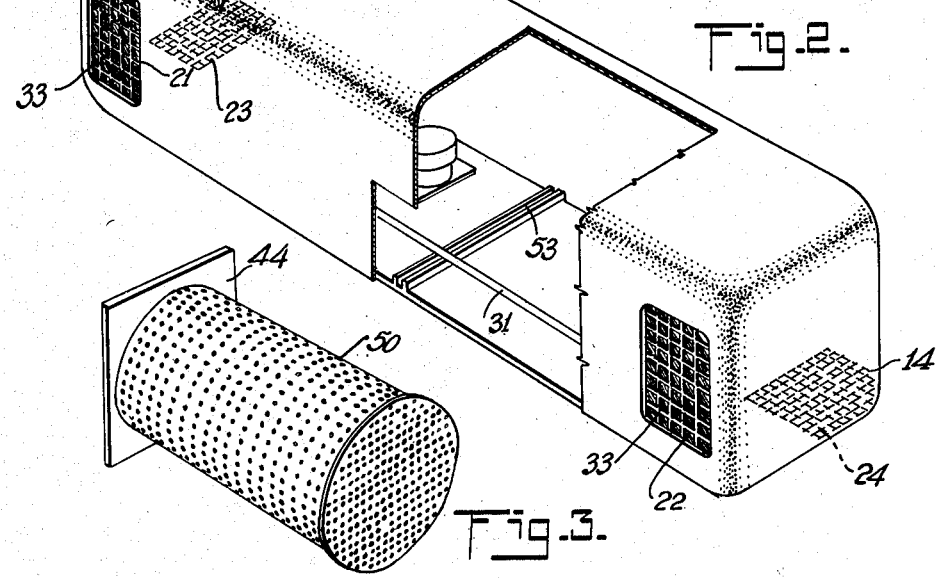
Fig.2.
Fig.3.
INVENTOR
CHESTER A. CHAMBERLAIN
By Robert Irving Williams
ATTORNEY

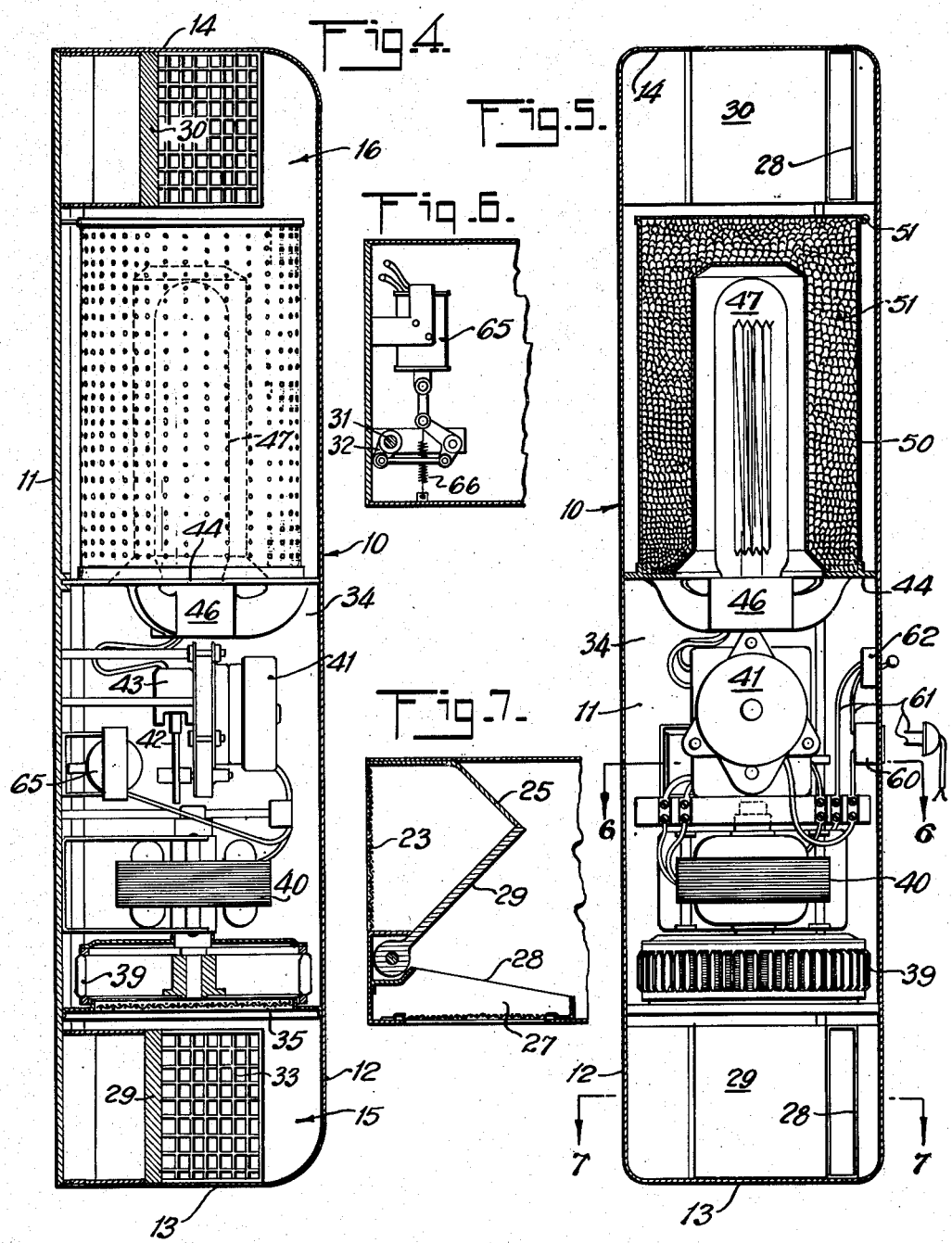

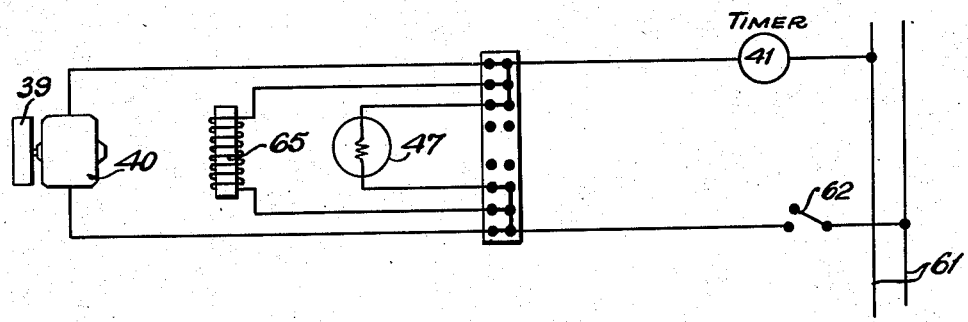
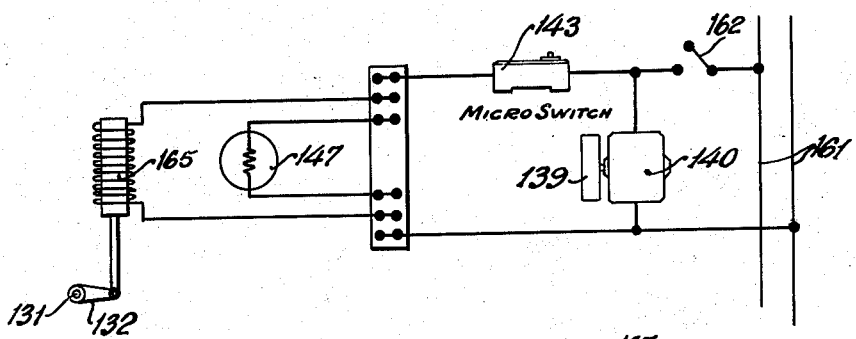
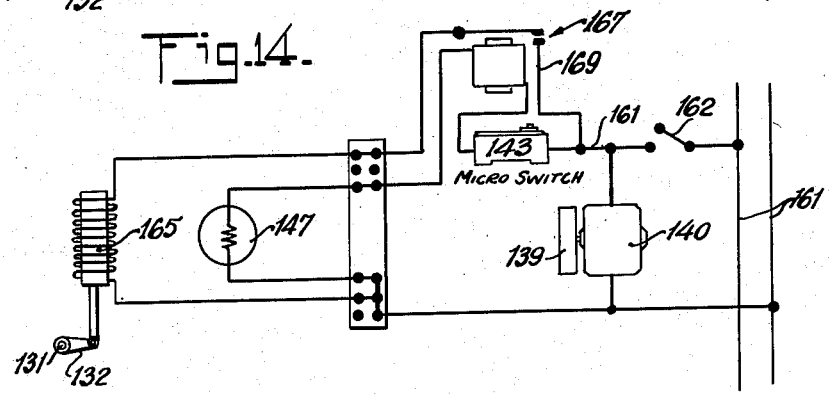

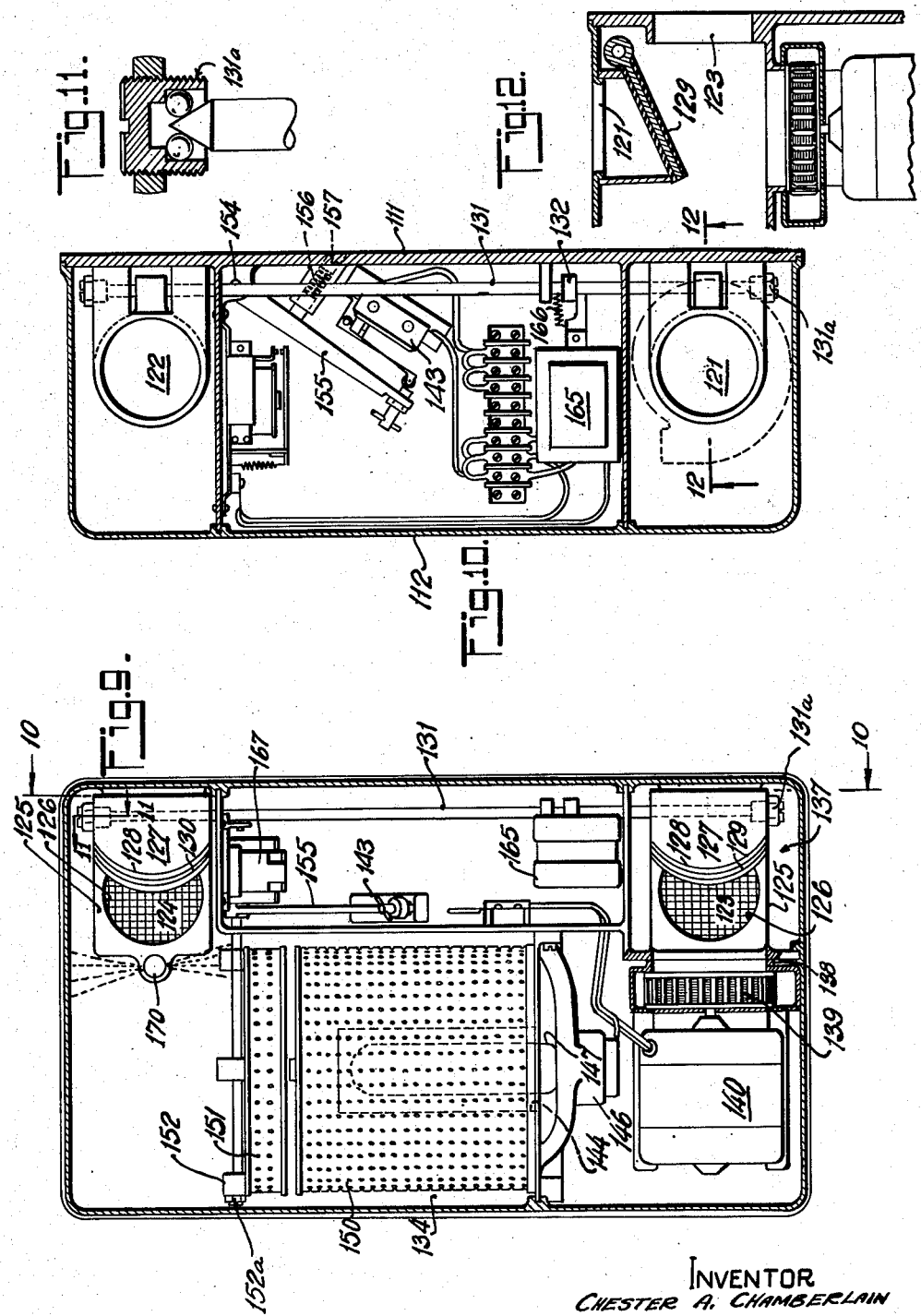

April 7, 1953     C. A. CHAMBERLAIN     2,633,928
DEHUMIDIFYING APPARATUS
Filed Sept. 28, 1946     10 Sheets-Sheet 5
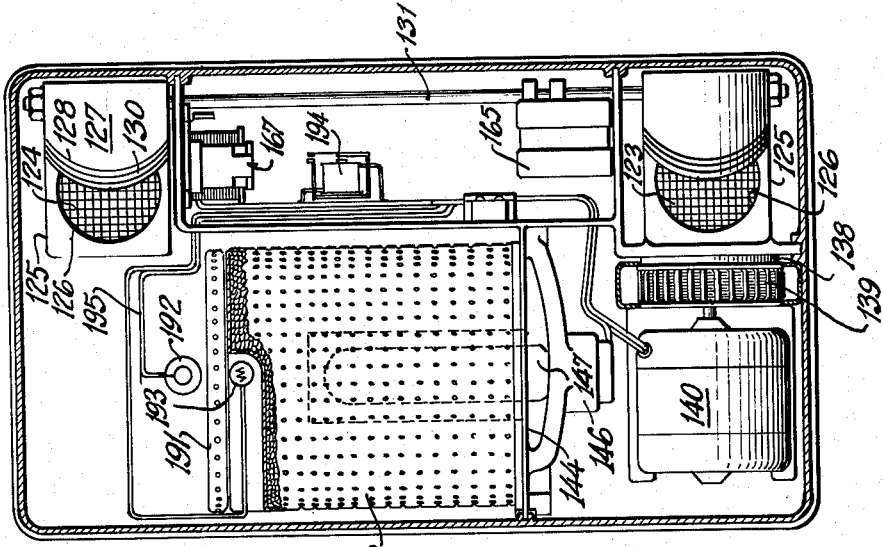
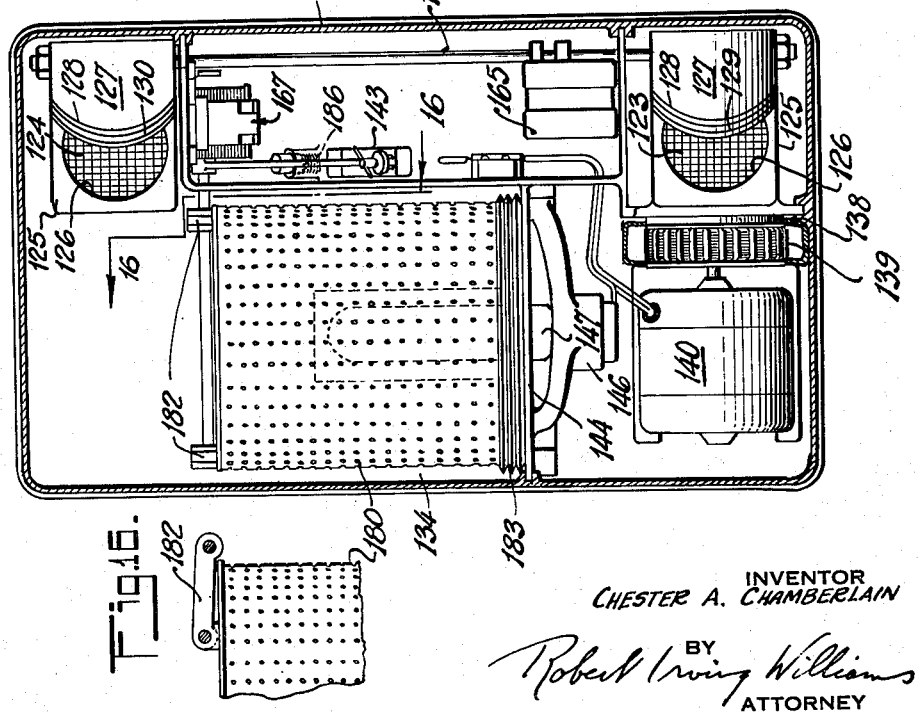
INVENTOR
CHESTER A. CHAMBERLAIN
BY
Robert Irving Williams
ATTORNEY

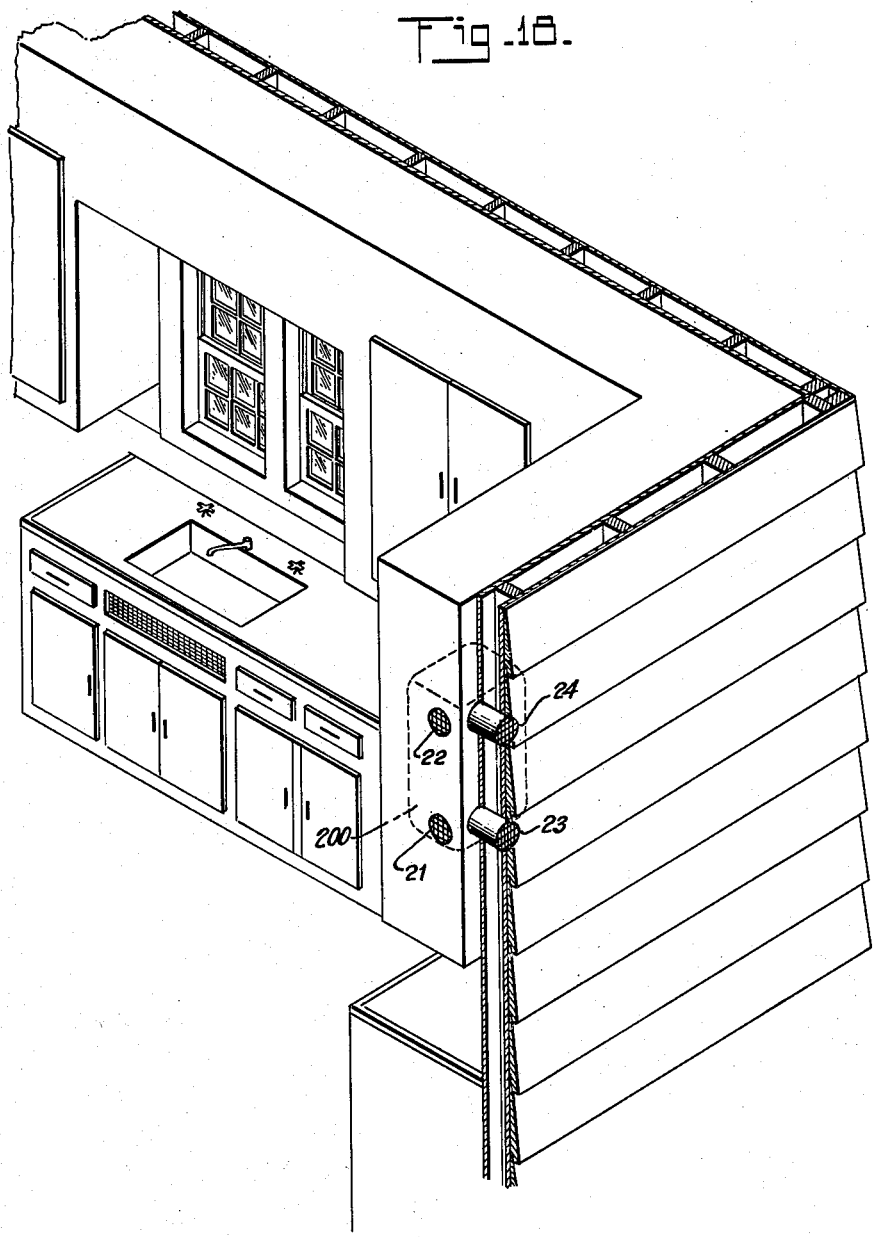

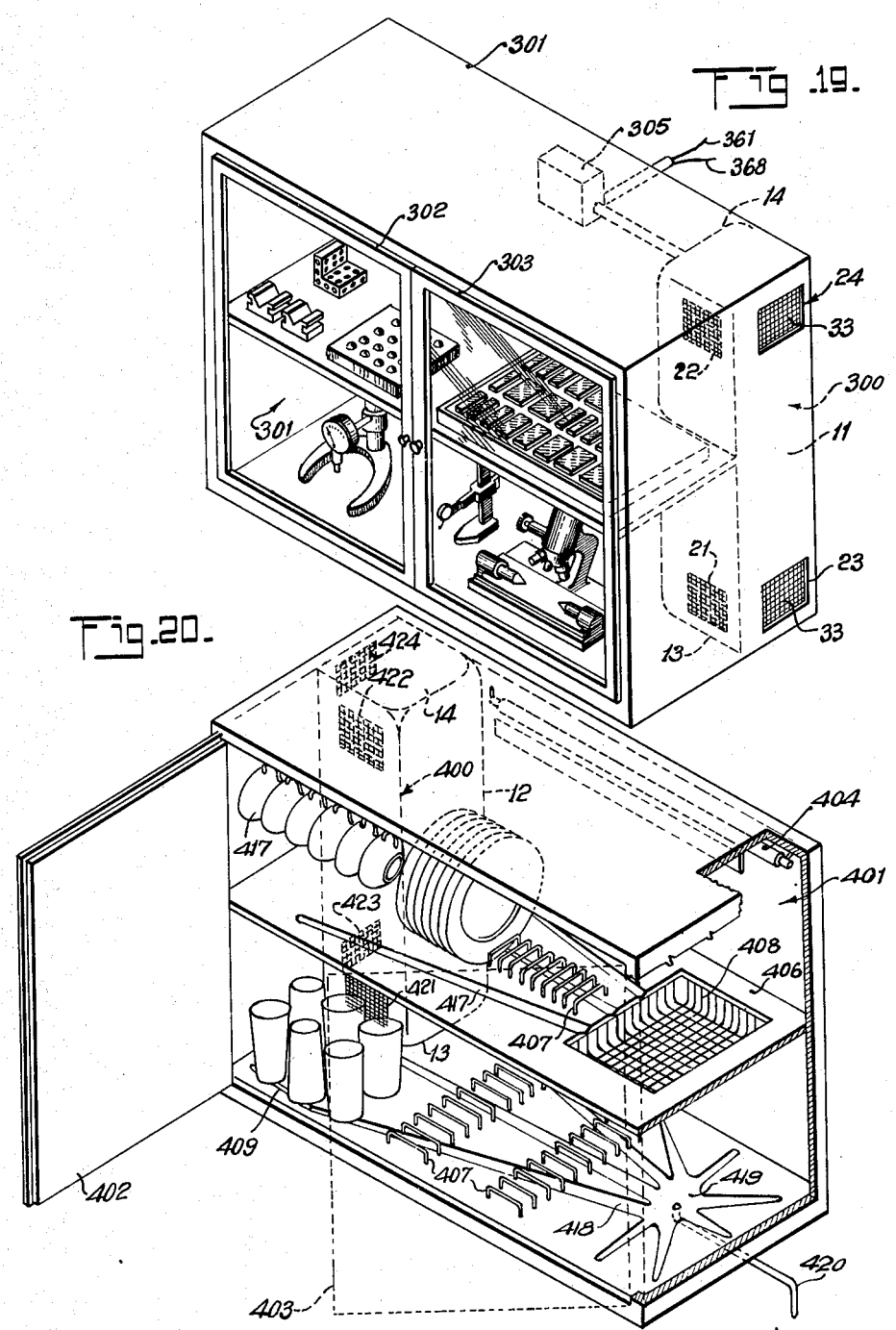

April 7, 1953  C. A. CHAMBERLAIN  2,633,928
DEHUMIDIFYING APPARATUS
Filed Sept. 28, 1946  10 Sheets-Sheet 8
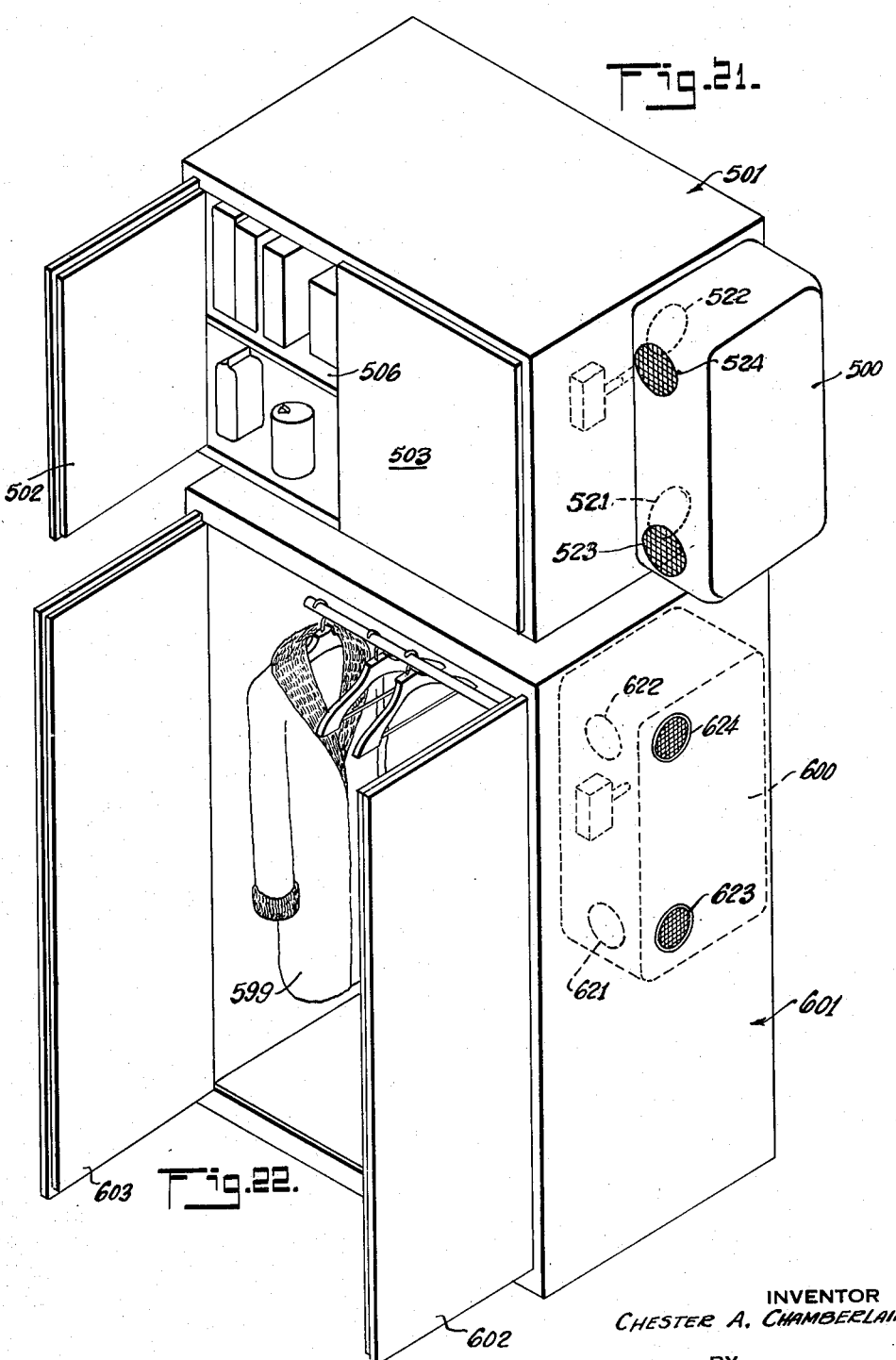
INVENTOR
CHESTER A. CHAMBERLAIN
BY
Robert Irving Williams
ATTORNEY April 7, 1953  C. A. CHAMBERLAIN  2,633,928
DEHUMIDIFYING APPARATUS
Filed Sept. 28, 1946  10 Sheets-Sheet 9

INVENTOR
CHESTER A. CHAMBERLAIN
BY
Robert Irving Williams
ATTORNEY

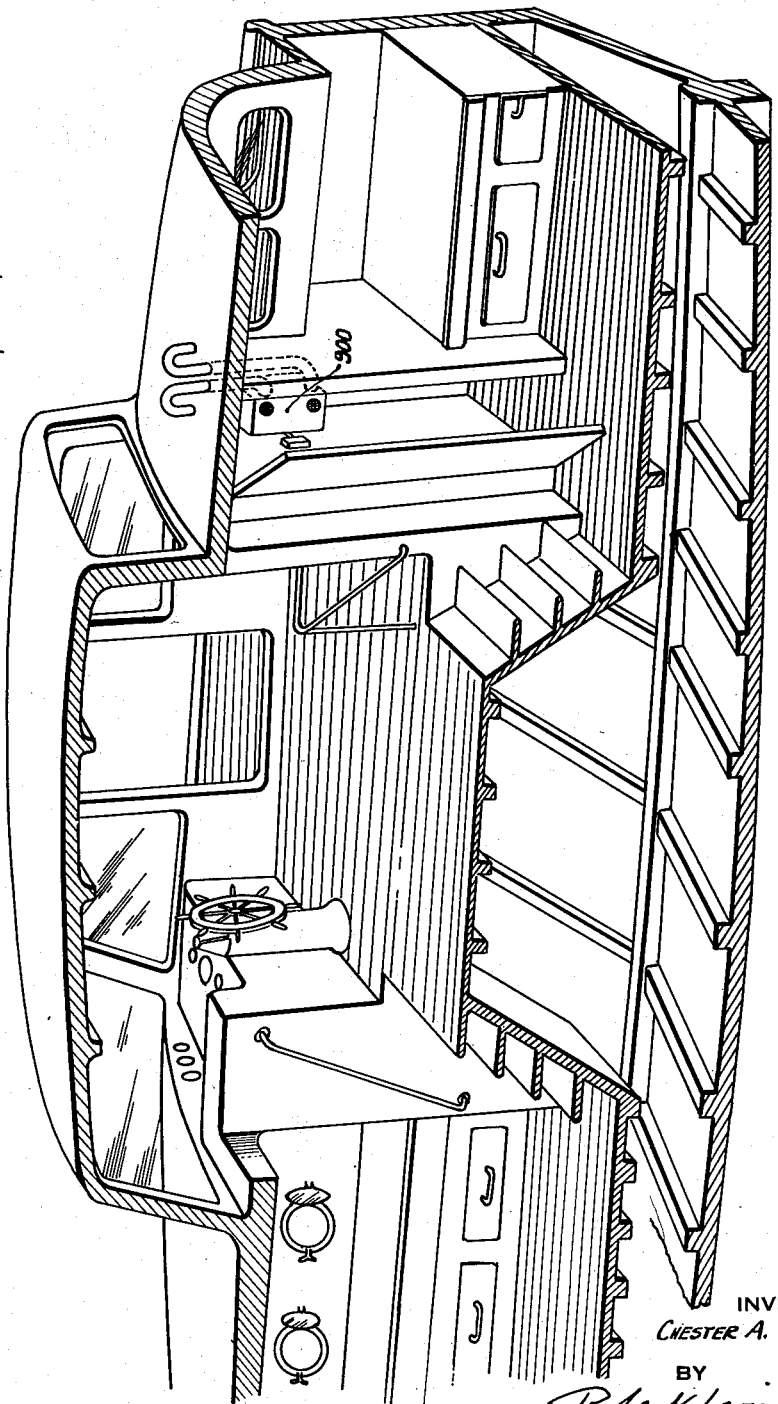

Patented Apr. 7, 1953

2,633,928

UNITED STATES PATENT OFFICE 2,633,928

DEHUMIDIFYING APPARATUS

Chester A. Chamberlain, Brooklyn, N. Y.

Application September 28, 1946, Serial No. 700,065

5 Claims. (Cl. 183—4.1)

This invention relates to dehumidifying apparatus and has as its primary object the provision of simple, compact, inexpensive, and effective dehumidifying apparatus of a character which may be readily utilized in the home, in an office, in a laboratory, in an enclosure for machinery or delicate instruments, or in any other space where problems of dangerous, oppressive, or otherwise undesirable humidity exist.

Another object is the provision of improved means for rendering dehumidifying apparatus automatically responsive to its own condition so that it will operate effectively and efficiently at all times.

Another object is the provision of improved means for drying dishes.

Still other objects are the provision of improved means for drying foodstuffs or maintaining them in a dry condition, and maintaining proper atmospheric conditions about clothes.

Other objects of the invention will in part be obvious and will in part appear hereinafter.

The invention accordingly comprises the features of construction, combinations of elements, and arrangement of parts which will be exemplified in the constructions hereinafter set forth and the scope of the application of which will be indicated in the claims.

Atmospheric humidity is an important factor in causing corrosion. Ordinary atmospheric air contains sufficient moisture to cause bright metal surfaces to corrode and many other materials to mildew, rot, and mold if exposed continuously. Corrosion will not occur in the absence of water and in a clean atmosphere if the relative humidity is maintained at 20% or below.

Rust preventive treatment of many metal surfaces can be accomplished successfully by the use of suitable protective coatings such as paint, liquid petroleum coatings, and strippable plastic coatings. In many cases, however, such methods are impractical. For example, stored electrical equipment cannot be maintained in operable condition if contaminated with moisture, and it is often difficult to apply protective coatings to such equipment. Bronze or brass fittings such as switches will tarnish if exposed for long periods of time in atmospheres of high relative humidity. A dry atmosphere also protects aluminum fittings against deterioration from corrosion by salt-laden air.

Very many types of dehumidifying and air conditioning apparatus have gone into general use or have been proposed for use in the last decade. Many of these are of the type which are only mildly effective or which are unreliable, while many others are so complex and expensive as to be impractical for use in most cabinets, compartments, kitchens, individual offices, small rooms, closets, or other enclosures of limited extent where the need for the protection of instruments and delicate machines and apparatus and for the comfort of persons working or living within the enclosures is often of great importance—usually of even greater importance than the needs in such enclosures as are now equipped with the common complicated air conditioning apparatus. Cabinets in which machine tools and precision instruments are used or stored, cabinets for storing surgical or dental instruments, and cabinets for storing dry foodstuffs are a few among many possible examples of rooms where the need for such dehumidifiers remains urgent in spite of the many types of dehumidifying means already on the market. Such needs have continued for many years and still remain unsatisfied and it is to satisfy such needs that the present invention is primarily designed.

Pursuant to the invention in its major aspects there is provided dehumidifying apparatus employing moisture absorbent material which can absorb a large amount of water while occupying a small amount of space. Of these, silica gel and generally equivalent materials, such, for example, as the silica-containing petroleum-base product known as "Sova Bead," are most desirable, but in certain instances activated alumina, activated bauxite, and activated carbon granules may be used, or mixtures of materials, as of activated carbon and silica gel, may be employed. Power blower means of a type which is insertable in a small space is provided. This is inserted in a single compact conduit for which there are provided ports having valve means arranged to give a unidirectional flow for interspersed absorption and activation cycles. In its simplest form the invention provides a straight line conduit. In certain of its aspects the invention provides an infra-red lamp for drying the absorbent material, and a canister especially adapted for use therewith and preferably providing a layer of absorbent material of substantially uniform thickness between perforate walls about or beyond the lamp, and desirably both about and beyond it. In certain of its aspects also it provides improved control means for initiating absorption and restoration cycles.

In ordinary electric dish dryers the dishes have had to be placed in the dryer, then removed, and then placed in the dish cabinet—a three-step manual operation which is often almost as troublesome as drying the dishes manually. In certain of its aspects, the present invention contemplates the provision of a dish-draining cabinet which is equipped with dehumidifying means whereby the drying of dishes will require only the one manual operation of putting the dishes in the cabinet—an operation which would have been necessary even if the dishes had remained unused.

For a fuller understanding of the nature and objects of the invention, reference should be had to the following detailed description taken in connection with the accompanying drawings, in which:

Figure 1 is a perspective view of one form of device embodying the invention, most of the cover being cut away;

Fig. 2 is another perspective view with only part of the cover cut away;

Fig. 3 is a perspective view of the canister;

Fig. 4 is a sectional view along the line 4—4 of Fig. 1;

Fig. 5 is a sectional view along the line 5—5 of Fig. 1;

Fig. 6 is a fragmentary sectional detail view along the line 6—6 of Fig. 5;

Fig. 7 is a similar view along the line 7—7 of Fig. 5;

Fig. 7a is a detail view of the mounting for the shaft;

Fig. 8 is an electrical diagram;

Fig. 9 is a side view of an alternative form with the cover cut away;

Fig. 10 is a sectional view along the line 10—10 of Fig. 9;

Fig. 11 is a sectional detail view along the line 11—11 of Fig. 9;

Fig. 12 is a sectional detail view along the line 12—12 of Fig. 10;

Fig. 13 is an electrical diagram of one form of circuit arrangement adapted for use in the form of construction shown in Figs. 9 and 10;

Fig. 14 is an electrical diagram of another form of electrical circuit;

Fig. 15 is a view similar to Fig. 9 showing a modified form of construction;

Fig. 16 is a sectional detail view along the line 16—16 of Fig. 15;

Fig. 17 is a view similar to Fig. 15 showing another modified form of construction;

Fig. 18 is a perspective interior view of a kitchen containing a dehumidifying unit embodying the invention;

Fig. 19 is a perspective view of a tool cabinet embodying the invention;

Fig. 20 is a perspective view of a dish drier embodying the invention;

Fig. 21 is a perspective view of a food cabinet embodying the invention;

Fig. 22 is a perspective view of a clothes cabinet embodying the invention; and

Figure 23:
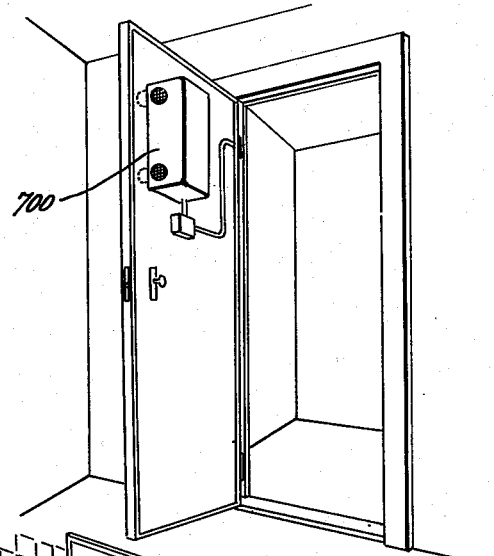
Figure 24:
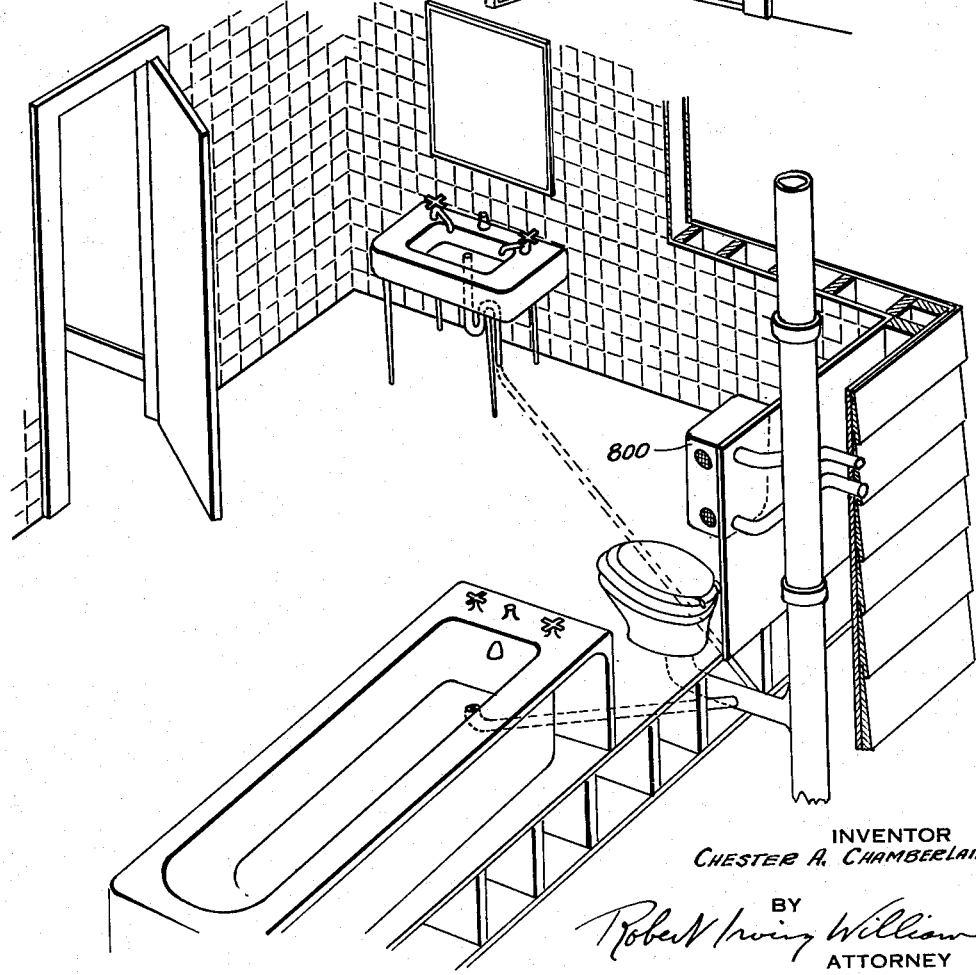

Figs. 23, 24, and 25 show respectively a closet, a bathroom, and a boat embodying the invention.

The form of construction shown in Figs. 1–8 comprises a casing 10 which, in the present instance, embodies a back 11 and a cover 12. The back carries at its ends 13 and 14 and end-members 15 and 16. The cover fits tightly over the end-members and the side edges of the back, so that the casing 10 is fully enclosed except for four ports. These ports, in the present instance, comprise a lateral port 21 in the cover leading to the end 13, a lateral port 22 in the cover leading from the end 14, a rear port 23 in the back leading to the end 13 and a rear port 24 in the back leading from the end 14. Channels 25 lead from each of the ports 23 and 24 to each of two rectangular openings 26 and channels 27 lead from each of the ports 21 and 22 to each of two rectangular openings 28. Hinged doors 29 and 30, at the ends 13 and 14 respectively, are adapted to be moved between the position shown in Fig. 1, where they close the openings 28 and the position shown in Fig. 4, where they close the openings 26. The two doors 29 and 30 are fixed on a shaft 31 having an arm 32 (see Fig. 6) by which it is adapted to be rotated in one direction to move the doors to a position where they close the lateral ports, or to be rotated in the opposite direction to a position wherein they close the rear ports. As will be seen a screen 33 is provided for each of the ports in the present instance.

The back and cover provide a conduit 34 running in a straight line from the end 13 to the end 14. Just beyond the end member 15 there is provided an additional screen 35, and beyond this is a fan 39, driven by a motor 40, and a timer 41 together with suitable wiring and accessories. The fan 39 is, in the present instance, a barrel type fan, and the motor 40 is a unidirectional motor. The timer 41, as exemplified, is of the type exemplified in the Haydon Patent 2,353,305, the operating shaft serving to drive cam 42 to actuate micro-switch 43 (see Fig. 4). This arrangement is advantageous because of its compactness and effectiveness, but any suitable type of timer may be used, and other types of control devices, such, for instance, as those hereinafter exemplified, may be employed are advantageous in certain instances. Beyond the timer, in the present instance, is a baffle 44 which extends entirely across the conduit except for an annular opening 45 in the central portion of which is a mounting 46 for a generally cylindrical lamp 47. Beyond the baffle 44 and surrounding the lamp 47 is a canister 50 adapted to contain absorbent granules 51 such, for instance, as silica gel granules. The canister has a tubular portion with a perforate annular wall facing said annular opening, a perforate external cylindrical wall slightly larger than the opening, and an internal cylindrical wall large enough to readily receive said lamp, and has an end portion disposed beyond the far end of the lamp, and formed with a small circular perforate near wall and a large circular perforate far wall. Pursuant to the present invention the end portion has the same thickness as the tubular portion so that, in general, the rays of the lamp will penetrate the same amount forwardly and laterally, and so that the resistance to flow will be generally similar thruout. Desirably there are employed granules which will pass a 6 mesh sieve, but will not pass a 16 mesh sieve. The canister should be spaced between ¼″ and ½″ from the lamp in most instances.

Desirably the lamp is of a type designed to radiate a high proportion of infra-red rays having a maximum drying effect, and the distance between the internal walls of the canister 50 and the lamp 47 as shown. The unit as shown is adapted to contain 1.2 pounds of silica gel. In general lamps of from 4,000 A. U. to 24,500 A. U. give effective results. The lamp 47 may be a 250 watt lamp adapted to radiate 11,000 A. U. A heat of 250° F. at the interior of the canister at its near end and 350° F. at its far end. The gel is desirably heated to from 212° F. to 500° F. Effective results have also been obtained with 90 watt lamps of 11,000 A. U. Desirably in such instances a canister having a content of 0.5 pound of silica gel is employed. The inner and outer walls and the annular forward wall of the container 50 are desirably formed of perforated copper sheet having 225 holes .039 inch in diameter per square inch of area as shown.

The device is drawn to scale. As exemplified it has a width of five and one-eighths inches and a thickness of five inches; and the canister has an outer diameter of three and seven-eighths inches.

The baffle prevents the flow of air thru the casing except thru the opening 45. The canister 50 and the baffle member 44 are in the present instance made as one removable unit, a slot 53 being formed in the back 11 to admit the lower edge of the baffle member. The lamp in the present instance is of such character that it may be secured in the mounting 46 before the unit 44—50 has been slid into place.

There is provided a socket 60 into which there may be plugged leads 61 from an electric circuit, and there is provided a hand switch 62 for turning the electrical installation on and off. When the switch 62 is in "on" position, the fan motor 40 and the timer are energized. Thus whenever the device is in operation the fan 39 is being rotated by the motor 40 so as to draw air from one or the other of the ports at the end 13 and to discharge air thru one or the other of the ports at the end 14. In order to control the desired type of flow, the timer operates a solenoid 65 at suitable intervals thru the medium of the micro-switch 43. When the solenoid 65 is energized the arm 32 and the shaft 31 are rotated in a clockwise direction (Fig. 6). To facilitate the movement of the shaft 31, it is mounted on a gimbal bearing as shown in Fig. 11. When the solenoid 65 is de-energized a spring 66 rotates the rod 31 in a counter-clockwise direction (Fig. 6). The lamp is in circuit with the solenoid and is thus activated only when the flow is between one set of ports—the rear ports in the present instance—so as not to heat the flowing air during the dehumidifying portion of the cycle but only during the reactivation portion of the cycle.

The canister, containing 1.2 pounds of silica gel, provides a high absorptive capacity while occupying a small space. The device is excellently adapted for use in positions where there is very little available space.

In operation the switch 62 is moved to "on" position and, assuming the timer is on the "absorption" portion or its cycle, the fan will suck air thru the port 21 and drive it thru the absorption means in the canister 50 and out of the port 22. This will continue until the timer changes cycle whereupon the solenoid 65 will be energized and the doors 29 and 30 moved to open the ports 23 and 24 and close the ports 21 and 22. At the same time the lamp 47 will be energized and the reactivation cycle will commence, with heat applied to the absorption means and dry air drawn in and moisture-laden air discharged. Desirably the speed of flow is 15–20 cubic feet per minute depending on the resistance of the quantity of absorbed moisture.

In the form of construction shown in Figs. 9–13 there is provided a back 111 and cover 112 provided with ports 121, 122, 123, and 124 corresponding to ports 21, 22, 23, and 24. There are provided channels 125 and 127 similar to the channels 25 and 27 leading to openings 126 and 128 which in the present instance are circular rather than rectangular but which are otherwise similar to the openings 26 and 28. Circular doors 129 and 130 are mounted on shaft 131 which is carried on gimbal mountings as at 131a adapted to be rotated by an arm 132 to move the doors so as to close off the channels 127 when in one position or the channels 128 when in the other position. As will be seen the conduit 134 passes thru two right angles instead of extending in a straight line as does the conduit 34, but the arrangement has the advantage that in spite of the large capacity of the operating elements which it contains it is exceedingly compact being only 18½ inches long, 10½ inches wide, and 6¾ inches thick.

The door 129 operates in a space 137 leading to a blower housing 138 containing a fan 139 similar to the fan 39 and arranged to discharge air from the housing 138 in an upward direction (Fig. 9). The fan 139 is driven by a motor 140 which is energized as hereinafter disclosed from mechanism including a micro-switch 143. To the right of the fan and motor is a baffle 144 carrying a mounting 146 for a lamp 147 which extends into a canister 150 all generally similar to corresponding elements in the form of Figs. 1–8 except for the larger size and effectiveness thereof. The lamp in the present instance is 250 watts and 11,000 A. U. A difference in the canister 150 is that the distance between the inner and outer further circular walls thereof is only half the distance between the inner and outer cylindrical walls. This is because of the provision beyond the further end of the canister 150 of a separate wafer-like canister 151 containing the same absorbent material as the canister 150 and constructed similarly. The wafer 151 is of a thickness equal to substantially half the distance between the inner and outer cylindrical walls of the canister 150, so that it, with the canister 150 provides absorptive material for substantially a uniform distance about the central cavity which contains the lamp 147. The canister is adapted to contain about 5.5 pounds of silica gel. A flow varying from thirty cubic feet per minute at 90–95% saturation to fifty cubic feet per minute at 5–7% saturation is desirable.

The wafer 151 serves as a portion of a weight control mechanism which in the present form of construction replaces the timer. The wafer 151 is carried on an arm 152 pivoted thru gimbal bearings 152a (like 131a) at 154 and carrying a lateral extension 155 which is adapted to operate the micro-switch 143 whenever the weight of the wafer 151 overbalances the pull of a spring 156. Thus an absorption cycle will continue until the wafer 151 reaches an undesirable degree of saturation, whereupon the tension of the spring 156 (having been properly set by adjusting means 157) will be overcome so as to operate the micro-switch. This will cause the lamp 147 to be lighted and cause the solenoid 165 to move the arm 132 against the pull of a spring 166 so as to swing the doors 129 and 130 from the position in which they shut the ports 123 and 124 to the position shown in Fig. 9 wherein they shut off the ports 121 and 122. The activation cycle will thus be started and will continue until enough moisture has been eliminated from the silica gel in the canister and in the wafer 151 so that the weight of the wafer will again be unable to overcome the pull of the spring 156, whereupon the spring 156 will cause a reverse operation of the micro-switch 143.

There is shown in Fig. 13 a circuit arrangement wherein the operation of the shaft 131 will be caused immediately upon the reverse operation of the micro-switch, the arrangement being generally similar to that shown in Fig. 8. In certain instances, however, it is desirable to have a circuit arrangement such as shown in Fig. 14 wherein the lamp is turned off a short time before the commencement of the absorption portion of the cycle to clean out the warm and moisture-laden air from the conduit 134. In this form of arrangement, as exemplified in Figs. 9–12 and 14, there is provided a time delay relay 167 which is in circuit with the micro-switch and is designed to remain energized for a given period—one minute as exemplified—after the micro-switch has broken the main circuit. A branch 169 of a lead 161 is in parallel with the micro-switch and is adapted to be broken by the time-delay relay only after its delaying function. The time-delay relay 167 thus serves to keep the solenoid 165 energized during the (one minute) period while the time-delay relay is operative, giving the fan an opportunity to clear out moist or hot gases after the lamp is turned off but before the shaft 131 has been operated to reverse the position of the doors.

In such instances as the elimination of bacteria, spores, and other harmful organisms is desirable, the invention contemplates the provision in the air-conditioning unit of means such as a lamp for giving off ultra violet radiation across the path of flow of the air from which moisture is to be, or preferably and as exemplified has been, absorbed. For instance in the form of construction of Figs. 9 and 10 there is provided an ultra violet lamp 170 adapted to give out rays across the path of dehumidified air which is approaching the exhaust port 122. In this manner the air may be cleared of all harmful organisms effectively and simply. In addition the provision of a lamp 170 is highly desirable when food, clothes, or other material which might be adversely affected by organisms is to be contained in the enclosure with which the unit is employed.

In certain instances where a particularly high degree of accuracy is desired it is preferable to have the entire canister act to operate the micro-switch. One such form of arrangement is shown in Fig. 15 wherein all the parts except the canister and balance arrangement are similar to those of Figs. 9 and 10. In the present instance, however, the canister 180 instead of being secured to the baffle 144 is pivotally mounted on pivoted arms 182, being in substance a combination of the canister 150 with the wafer 151. Diaphragm 183 is provided between the baffle and the canister 180. The arms 182 operate micro-switch 143. A stronger spring 186 replaces the spring 156.

Electrical rather than gravity moisture-responsive means are advantageous for use in certain instances. Means of this character are exemplified in Fig. 17 wherein there is provided a construction similar to the construction of Figs. 9 and 10 except that the wafer is fixedly mounted and is filled with silica gel containing a moisture-responsive dye such for example as a cobalt dye which will acquire its normal blue color only when the silica gel is dry, and that the end wall of the canister 190 is formed with a recess 192. The wafer 191 is formed of transparent material; and an electric eye 193 is disposed on the outside of the wafer and a lamp 194 in the recess 192. The electric eye is connected with a circuit closing relay 194 by electrical conducting means 195.

One of the many places in which dehumidifying units such as exemplified may be advantageously used in accordance with the invention is exemplified in Fig. 18 wherein there is shown a kitchen containing a dehumidifying unit 200 which may be a unit such as that of Fig. 1 with the ports 21 and 22 opening into the kitchen and the ports 23 and 24 opening to the outer air.

Another application is exemplified in Fig. 19 wherein there is shown a unit 300 disposed in a cabinet 301 having doors 302 and 303 and adapted to contain various types of comparators, jewelers' lathes, ball-bearing containers, etc. Within the cabinet 301 is a hydrostat 305 adapted to close the circuit between leads 361 and leads 368 from a power supply line. The leads 361 are adapted when connected to the leads 368 to supply energy for operating parts in the same manner as the leads 61 and 161. Once the unit 300 has extracted the necessary amount of humidity from the air in the enclosure 301, however, the hydrostat will disconnect the leads 361 from the leads 368 so that there will be no wasteful operation of the unit 300. However, when the doors have been opened to remove or replace a tool or accessory, or when natural leakage causes the humidity within the cabinet 301 to rise, the hydrostat will again close the circuit and the unit 300 will operate. If the unit 300 happens to be at an activation stage of its cycle it will quickly dry itself and then, before any significant damage has been done by the moisture that has entered the cabinet, will dehumidify the cabinet. Thus the tools and accessories in the cabinet will always be kept in a dry and safe condition regardless of shutdowns of the plant even tho due to unexpected conditions such as storms or strikes. When shutdowns occur the unit will operate only when necessary, but will operate surely and effectively; thus achieving a maximum of safety together with a maximum of economy.

Another application of units such as hereinbefore exemplified is, according to the invention, dish drying apparatus. One such apparatus is exemplified in Fig. 20 and comprises a unit 400 in an enclosure 401 having doors 402 and 403. Ultra-violet lamps 404 are provided to sterilize the dishes. The cabinet exemplified comprises a shelf 406 carrying a dish rack 407 and a silver drain 408. Additional racks 407 and a glass-receiving space 409 are provided on the bottom floor. Cups may be hung as shown.

The shelf 406 is provided with drain means 417 leading to the open-work and silver-drain, and the bottom floor of the cabinet is provided with drain means 418 leading to a sump 419 beneath the silver-drain from which a pipe 420 leads. The pipe desirably and as exemplified is of sufficient size to readily carry away the drainage but of such size and length that moisture-laden air will not readily enter the enclosure therethru. The unit 400 is formed with ports 421 and 422 opening into the cabinet and with ports 423 and 424 opening out of the cabinet: and may be of any of the types contemplated by the invention including those heretofore exemplified.

Still another application of the exemplified units and arrangement contemplated by the invention in certain of its aspects is exemplified in Fig. 21 where there is shown a unit 500 adapted to dehumidify a food cabinet 501 which may contain cereals, crackers, toast, dehumidified vegetables, dried soups, foods to be dried, spices, salt, and various other comestibles. The enclosure 501 is provided with doors 502 and 503 and in the present instance with a shelf 506. The unit 500 in the present instance is disposed outside rather than inside the cabinet 501 by the ports 521 and 522 are connected with the interior of the cabinet. The ports 523 and 524 are adapted to draw air from without the cabinet and discharge it outside of the cabinet.

An additional application is for protecting clothes as indicated at 599 in Fig. 22. A unit 600 such as heretofore exemplified is provided in a cabinet 601 having doors 602 and 603.

Still other applications are shown in Fig. 23 where the unit 700 is shown in a clothes closet; Fig. 24 where the unit 800 is shown in a bathroom; and Fig. 25 where the unit 900 is shown in the cabin of a boat.

I claim:

1. Dehumidifying apparatus comprising an elongated member having a pair of ports at one end, a pair of ports at the other end, valve means for said ports, said member comprising a conduit extending in a direct line between said pairs of ports, a fan in said conduit, a canister removably disposed in said conduit and having a cylindrical portion adapted to receive radiant means, said cylindrical portion being formed with a perforate inner wall surrounding said radiant means and with a perforate outer wall spaced from the sides of said conduit, baffle means preventing gas-flow thru said conduit except thru said canister, and timer means to operate said valve means.

2. Dehumidifying apparatus comprising an elongated member having a pair of ports at one end, a pair of ports at the other end, valve means for said ports, said member comprising a conduit extending in a direct line between said pairs of ports, a fan in said conduit, a canister removably disposed in said conduit and having a cylindrical portion adapted to receive radiant means, an electric heating element, said cylindrical portion being formed with a perforate inner wall surrounding said radiant means and with a perforate outer wall spaced from the sides of said conduit, baffle means preventing gas-flow thru said conduit except thru said canister, and means for operating said valve means in response to the amount of moisture in a moisture absorbent substance in said conduit.

3. Dehumidifying apparatus comprising a conduit, a first body of moisture-absorbent material therein, means to permit passage therethru of gas to be dried, means to permit passage of drying gas therethru, an electric eye, a second body of moisture-absorbent material watched by said electric eye and adapted to absorb moisture when the first body of moisture-absorbent material is absorbing moisture and to lose water when said first body of moisture-absorbent material is losing water, and means controlled by said electric eye to control the operation of said passage permitting means.

4. Dehumidifying apparatus comprising a canister, moisture-absorbent material in the canister, a hollow within the canister, an infra-red radiant element in said hollow, a body of moisture-absorbent material subject to color changes upon absorption of moisture and loss of moisture and subject to moisture-receiving and moisture-yielding conditions at the same time that that in said canister is subject to such conditions, an electric eye responsive to control changes in said body, and means controlled by said electric eye to control the energization of said radiant element.

5. Dehumidifying apparatus comprising a back, a forwardly extending baffle plate, an absorbing unit carried by said plate, a groove in said back for the reception of the edge of said plate to permit the removal of said plate and said absorbing unit, a radiant element within said absorbing unit, mounting means for said radiant element carried by said plate, means adapted to cooperate with said back to provide a flow casing, and a fan and a control member therefor within said casing, said casing being provided with ports at its end portions, and valve means to control the flow thru said ports.

CHESTER A. CHAMBERLAIN.

REFERENCES CITED

The following references are of record in the file of this patent:

UNITED STATES PATENTS

| Number | Name | Date |
| --- | --- | --- |
| 1,206,977 | Batter | Dec. 5, 1916 |
| 1,499,903 | Beck | July 1, 1924 |
| 1,920,914 | Poggel | Aug. 1, 1933 |
| 2,066,847 | McShea | Jan. 5, 1937 |
| 2,075,036 | Hollis | Mar. 30, 1937 |
| 2,083,732 | Moore et al. | June 15, 1937 |
| 2,095,502 | Johnston | Oct. 12, 1937 |
| 2,106,838 | Gates | Feb. 1, 1938 |
| 2,124,268 | Williams | July 19, 1938 |
| 2,136,618 | Hull | Nov. 15, 1938 |
| 2,178,445 | Warneke | Oct. 31, 1939 |
| 2,181,672 | Sutcliffe et al. | Nov. 28, 1939 |
| 2,221,351 | Kempf | Nov. 12, 1940 |
| 2,248,225 | Fonda | July 8, 1941 |
| 2,257,487 | Tenney | Sept. 30, 1941 |
| 2,328,129 | Earle | Aug. 31, 1943 |
| 2,355,014 | Schorn | Aug. 1, 1944 |
| 2,411,039 | Heuser | Nov. 12, 1946 |